Patented Apr. 30, 1946

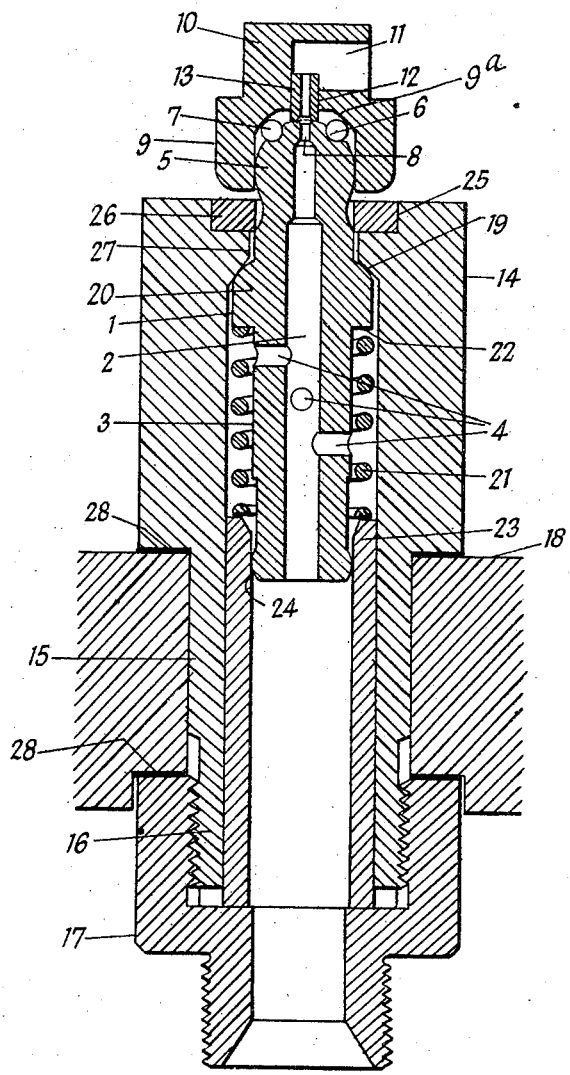

2,399,539

UNITED STATES PATENT OFFICE 2,399,539

ANTIFRICTION BEARING HAVING FLUID PASSAGES

Robert Cecil Braithwaite, Manchester, England, assignor to Metropolitan - Vickers Electrical Company Limited, London, England, a company of Great Britain Application October 9, 1943, Serial No. 505,707
In Great Britain May 28, 1940

7 claims. (Cl. 285—97.1)

This invention relates to anti-friction rotary bearings having passages through them for the free flow of air or other fluid, and one of the objects of the invention is to reduce the bearing friction to a very low value. Other objects are to provide a bearing which allows a small want of alignment, is easy to assemble, is amenable to mass-production methods, and to provide a bearing which is substantially immune from the effects of shock such as may arise in transit. The bearing is particularly suitable for use in mechanical relays of the fluid jet type.

According to the invention one member of the bearing which is conveniently the fixed member thereof (hereinafter referred to as the bearing pin) has an axial passage for the fluid and has mounted coaxially upon one end through an antifriction ball race the other member, preferably the rotatable member of the bearing, (hereinafter referred to as the rotatable bush) which rotatable bush has an axial hole leading to a fluid inlet or outlet passage in which hole is disposed, preferably with a ground fit, a "floating" sleeve or tube one end of which is ground or otherwise made accurately to fit the end surface of the bearing pin. With this arrangement it will be appreciated that the floating sleeve or tube, which is preferably of small diameter and being a close fit in the hole in the rotatable bush, reduces the rotational friction to a minimum whilst providing a sufficiently effective fluid seal between the rotatable bush and the bearing pin. The fluid sealing may be improved by making the abutting surfaces of the floating sleeve or tube and the end of the bearing pin spherical. Preferably the end of the bearing pin is in the form of a spherical knob and the abutting end of the floating sleeve or tube spherically concave. If it is still further desired to increase the fluid sealing effect the floating sleeve or tube may be reduced or stepped in outside or inside diameter at its end which abuts against the end of the bearing pin so that by differential piston diameter effect such sleeve or tube is gently pressed towards the bearing pin by the existing fluid pressure, the space within the rotatable bush being at substantially surrounding pressure.

If on the other hand it is desired to reduce the friction of the bearing to a minimum then the floating sleeve or tube may be given such a friction fit within the hole in the rotatable bush that although in assembling the members the end of the floating sleeve or bush will fully engage the end of the bearing pin, after pressing the rotatable bush towards the bearing pin or after rotational movement between these members, the floating sleeve or tube, as has been found in practice, will recede slightly so that its end is separated from the end of the bearing pin by a distance which may be of the order of a fraction of one-thousandth of an inch, a very effective fluid seal being provided nevertheless.

While the second member is referred to as a bush it will be appreciated that it need not take this form and may for instance be integral with a spindle or other part of one of the relatively moving portions of the device.

In carrying out the invention the rotatable bush which may have a radial fluid passage communicating with its axial hole carrying the floating sleeve or tube, is preferably formed with a cylindrical recess or bore in which is accommodated with a very small clearance of the order of one or two-thousandths of an inch the spherical end or knob of the bearing pin, whilst the end of such recess or bore is preferably conical or spherical to provide one ball race surface whilst the other ball race surface is conveniently formed by a groove of circular section cut around the spherical end of the bearing pin at such a place thereon that the balls are clear of the cylindrical portion of the bore or recess in the rotatable bush.

The bearing pin, according to another feature of the invention may be disposed in a tubular housing the bore of which is provided with a conical or hollow spherical shoulder near that end of the housing adjacent which the rotatable member of the bearing is located, the bearing pin being provided with a conical or convex spherical portion which is adapted to bear against the shoulder just above mentioned, the two surfaces being preferably ground together. The bearing pin is provided with another shoulder against which bears a helical compression spring surrounding the bearing pin and engaging at its other end with a liner which is retained within said housing by means of a nut, which conveniently assumes the form of a union nut, and which may serve also to clamp the housing in a perforation in a supporting plate or member. The shank end of the aforesaid bearing pin is preferably of such length as to extend into the end of said liner which it interiorly engages at a spherical bulge formed on the shank of the bearing pin. Radial holes may be formed in the bearing pin if it is found necessary to equalise fluid pressure.

The aforesaid housing carries at its end, preferably in a recess, a pad of rubber or other resilient material against which the rotatable member of the bearing can engage in case said rotatable member receives a blow or is otherwise forcibly urged towards the housing, such movement being permitted by reason of the arrangement of the spring as hereinbefore described. By such means the bearing is rendered substantially immune from the effects of relatively heavy blows.

To enable the invention to be fully understood a preferred embodiment thereof which has proved successful in practice will now be described by way of example with reference to the accompanying drawing, the single figure of which is a sectional elevation of the embodiment.

In the drawing, 1 is the bearing pin which is preferably formed of hard steel, having the axial bore 2 and a shank portion 3 with radial holes 4 for equalising fluid pressure. The upper end of the steel bearing pin 1 is in the form of a spherical knob as shown at 5, and has the peripheral groove 6 for the anti-friction balls 7. The bore 2, it will be seen, terminates in an extreme end portion 8 of relatively small diameter. At 9 is shown the rotatable bush which may be formed of steel and which may have a spigot portion 10 on to which may be driven with a push fit the relay jet or other device to be carried by the rotatable bush 9 which may have a radial fluid passage as indicated at 11. Communicating with this passage the bush 9 is provided with the hole 12 in which is fitted the floating sleeve or tube 13 which confronts the end of the bearing pin 1, all as hereinbefore set forth. Preferably the floating sleeve or tube 13 which has a relatively small diameter, is formed of brass or other relatively soft metal.

The concave ball race surface 9a in the rotatable bush 9 is spherically shaped, and so that its centre of curvature substantially coincides with the centre of curvature of the spherically shaped region of the pin 5 in the neighbourhood of the orifice 8 when in working assembly.

The bearing pin 1 is mounted in a housing 14 which may be formed from mild steel hexagon bar from which is turned a shank 15 having a screw threaded lower end 16 adapted to receive the union nut member 17, whereby the housing 14 may be clamped in a perforation in the supporting plate 18, and fluid conducting connection made.

The bearing pin 1 is preferably formed with a spherical shoulder 19 bearing against and ground with a conical or spherical shoulder 20 formed in the upper end of the housing 14, the surfaces being held together by means of the helical spring 21 the upper end of which bears against another shoulder 22 on the bearing pin 1 and the lower end of which bears against the end of the liner 23 of phosphor bronze which is a push fit within the lower end of the shank portion 15 of the housing 14. Preferably the lower end of the bearing pin 1 has an annular bulge or spherical portion 24, the centre of the sphere being on the axis, and the bulge preventing the bearing pin jamming within the liner 23 during the assembly of the parts, which assembly, it will be appreciated, is very simple.

The end face of the housing 14 is provided with an annular recess 25 within which is accommodated the washer 26 of india rubber or artificial rubber having an inner diameter less than the bore 27 at the upper end of the housing 14.

Packing or seating washers 28 may be provided between the supporting plate 18 and the housing 14 and union nut 17 as may be found necessary or desirable.

During the assembly of the parts, it will be obvious that the balls 7 may be held in position by petroleum jelly or other suitable adhesive material, and the tube 13 left projecting into the cavity of the bush 9 sufficiently to make contact with the head of the pin 5 before the balls engage both race surfaces; axial force then applied to the bearing will cause the tube 13 to slide in its bearing hole till the balls engage both races and upon relief of this force the parts will take up relative positions such that a minute clearance exists between the end face of tube 13 and the crown of the pin 5 sufficient for the avoidance of friction but not large enough to cause appreciable fluid leak.

It will be appreciated that the slight clearance between the recess or bore in the under side of the rotatable bush 9 allows for slight lack of alignment between the bush and the bearing pin 1.

It will also be understood that the general arrangement renders the device substantially immune from the effects of shock such as may occur in transit.

I claim:

1. An anti-friction rotary bearing for supporting a member for rotation relatively to another member while affording fluid passage between said members, comprising a bearing pin having an axial passage, a bush having a fluid opening and a communicating axial hole, balls circularly distributed around the axial hole and on which said bush rests, said balls being carried on one end of the bearing pin, and a sleeve closely fitting the axial hole of the bush and with its end surface accurately conforming to that of the bearing pin for establishing fluid passage between the bore of the bearing pin and the interior of the bush while preventing fluid leakage at the opposing surfaces of the bearing pin and the bush, notwithstanding misalignment of the bush and bearing pin.

2. An anti-friction bearing comprising a bearing pin having an axial passage, a bush having a fluid opening and an axial passage communicating therewith, said bush being rockably and rotatably supported upon the end of the bearing pin, and a floating sleeve extending through the axial passage in the bush into slidable engagement with the surface of the bearing pin bordering its axial passage, therewith to provide a fluid coupling between the bearing pin and bush having an anti-friction fluid-tight seal extending all around the axial passage.

3. An anti-friction bearing as claimed in claim 2, wherein the engaging surfaces of the floating sleeve and the bearing pin are mutually spherical and ground together.

4. An anti-friction thrust bearing comprising a spherical knob having an axial passage, a cylindrically recessed bush having a fluid outlet and an axial passage communicating with said outlet and terminating in the cylindrical recess of the bush, a plurality of spherical balls resting on the spherical knob and in turn engaging the surface of the cylindrical recess of the bush for rotatably supporting said bush while permitting freedom of movement thereof axially and transversely relatively to the knob, and a floating sleeve having a spherical end resting upon the spherical knob in registering alignment with the axial passage therein and extending through the axial passage in the bush.

5. An anti-friction thrust bearing comprising a bearing pin having a rounded end and an axial passage together with an intermediate external shoulder, a tubular housing having a radially inwardly projecting shoulder, spring means for resiliently mounting the bearing pin in the housing with its rounded end protruding upwardly therefrom and with said shoulders mutually reacting to provide a fluid seal opposing fluid leakage from the axial passage to the exterior of the housing, a bush having a fluid opening and an axial passage communicating therewith, said bush being rotatably but non-rigidly supported on the rounded end of said bearing pin, a floating sleeve extending through the axial passage in the bush and resting at one end against the rounded end of the bearing pin with its bore in alignment with the axial passage in the bearing pin, to complete a fluid passage between the interior of the housing and the interior of the bush while providing a fluid seal between opposing surfaces of the bush and bearing pin, and means for the passage of fluid under pressure to the interior of the housing.

6. An anti-friction thrust bearing affording fluid passage from a stationary member to a rotational member, comprising a tubular housing adapted for mounting on the stationary member and having a fluid inlet at one end and an inwardly projecting shoulder adjacent its other end, a bearing pin having a rounded end and an axial passage and having a circumferential convex external bulge at its other end, and provided with two intermediately spaced oppositely facing external shoulders, a liner for one end of the housing, said bearing pin being mounted in the housing with the said bulge engaging the interior surface of the liner and with its rounded end projecting from the other end of the housing, a spring surrounding the intermediate portion of the bearing pin and held in compression between one of the shoulders of the bearing pin and the inner end of the liner resiliently to press the other shoulder of the bearing pin into fluid-sealing engagement with the shoulder of the housing, a bush having a fluid outlet and an axial passage connected thereto, a plurality of balls resting on the rounded end of the bearing pin in circular distribution around said axial passage and in turn rotatably supporting said bush without rigidity, and a floating sleeve extending through the axial passage in the bush and co-operating with the rounded end of the bearing pin to prevent fluid leakage through the gap between opposing surfaces of the bush and bearing pin.

7. An anti-friction thrust bearing according to claim 6, wherein the bearing pin is provided with a pressure equalizing radial passage putting its axial passage into communication with the space trapped between the exterior of the bearing pin and the interior of the housing.

ROBERT CECIL BRAITHWAITE.